US010635225B2

(12) United States Patent
Seok et al.

(10) Patent No.: US 10,635,225 B2
(45) Date of Patent: Apr. 28, 2020

(54) STEERING WHEEL, VEHICLE HAVING THE STEERING WHEEL, AND METHOD FOR CONTROLLING THE VEHICLE

(71) Applicants: Hyundai Motor Company, Seoul (KR); Kia Motors Corporation, Seoul (KR)

(72) Inventors: Donghee Seok, Suwon-si (KR); Gideok Kwon, Seoul (KR); Jong Bok Lee, Suwon-si (KR); HeeJin Ro, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/828,973

(22) Filed: Dec. 1, 2017

(65) Prior Publication Data

US 2019/0025974 A1 Jan. 24, 2019

(30) Foreign Application Priority Data

Jul. 21, 2017 (KR) ........................ 10-2017-0092401

(51) Int. Cl.
*G06F 3/041* (2006.01)
*B62D 1/06* (2006.01)
*B62D 1/04* (2006.01)
*G06F 3/0488* (2013.01)
*G06F 3/044* (2006.01)

(52) U.S. Cl.
CPC ........... *G06F 3/0416* (2013.01); *B62D 1/046* (2013.01); *B62D 1/06* (2013.01); *G06F 3/0488* (2013.01); *G06F 3/044* (2013.01)

(58) Field of Classification Search
CPC ......... G06F 3/0416; G06F 3/044; B62D 1/06; B62D 1/04
See application file for complete search history.

(56) References Cited

U.S. PATENT DOCUMENTS

| 2007/0100523 | A1* | 5/2007 | Trachte | .................. B60K 35/00 701/41 |
| 2012/0044170 | A1* | 2/2012 | Homma | ................ G06F 3/0488 345/173 |
| 2014/0156107 | A1* | 6/2014 | Karasawa | .......... G01C 21/3664 701/1 |
| 2014/0292692 | A1* | 10/2014 | Okuyama | .............. B62D 1/046 345/173 |

(Continued)

FOREIGN PATENT DOCUMENTS

JP 2017-030746 A 2/2017
KR 10-2015-0137827 A 12/2015
(Continued)

*Primary Examiner* — Lixi C Simpson
(74) *Attorney, Agent, or Firm* — Morgan, Lewis & Bockius LLP

(57) ABSTRACT

A steering wheel with a touch area dynamically set up based on the driver's hand position may include touch input configured to receive a touching input of a driver; and a touch controller configured to set up a touch area for manipulation on the touch input to control components of a vehicle based on a touch area, in which the touching input is received, wherein the touch controller is further configured to determine a palm touch area of the driver and set up a touch area for manipulation around the palm touch area.

19 Claims, 8 Drawing Sheets

(56) References Cited

U.S. PATENT DOCUMENTS

2015/0029111 A1\* 1/2015 Trachte ................ G06F 3/0418
345/173
2017/0305453 A1\* 10/2017 Nishio ................ H03K 17/975

FOREIGN PATENT DOCUMENTS

| KR | 10-2016-0079594 A | 7/2016 |
| KR | 10-2016-0093496 A | 8/2016 |

\* cited by examiner

STEERING WHEEL, VEHICLE HAVING THE STEERING WHEEL, AND METHOD FOR CONTROLLING THE VEHICLE

CROSS-REFERENCE TO RELATED APPLICATION

The present application claims priority to Korean Patent Application No. 10-2017-0092401, filed on Jul. 21, 2017, the entire contents of which is incorporated herein for all purposes by this reference.

BACKGROUND

Field of the Invention

The present invention relates to a steering wheel, vehicle including the steering wheel, and method for controlling the vehicle.

Discussion of Related Art

Vehicles basically run on the road but also provide various user convenient functions, such as audio play, video play, navigation, air conditioning control, seat control, lighting control, etc.

These days, a touch input device is disposed on a steering wheel to prevent distraction of the driver behind the wheel and to facilitate the driver's convenience, so the driver is able to control components of the vehicle while holding the steering wheel.

However, the existing touch input device disposed on the steering wheel is located at a fixed position on the steering wheel, so it is difficult to manipulate the touch input device when the driver changes positions of his or her hand on the steering wheel while driving the vehicle. Furthermore, the hand grip positions felt comfortable differ by drivers, making the touch input device less usable and comfortable.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a steering wheel with a touch area dynamically set up based on the driver's hand position, a vehicle including the steering wheel, and a method for controlling the vehicle.

In accordance with various exemplary embodiments of the present invention, a steering wheel including: a touch input configured to receive a touching input of a driver; and a touch controller configured to set up a touch area for manipulation on the touch input to control components of a vehicle based on a touch area, in which the touching input is received, wherein the touch controller is further configured to determine a palm touch area of the driver and set up a touch area for manipulation around the palm touch area.

The touch input may be disposed on the rim portion of the steering wheel.

The touch controller may be configured to set an area a predetermined offset away from the palm touch area to the touch area for manipulation.

The touch controller may be configured to set two areas a predetermined offset away from the palm touch area in opposite directions to the touch area for manipulation.

When a touching input is received in the touch area for manipulation, the touch controller may be configured to change the offset based on a point at which the touching input is received in the touch area for manipulation.

The touch controller may be configured to change the offset based on a distance between the point at which the touching input is received and a point in the palm touch area.

The touch controller may be configured to set up a plurality of touch areas for manipulation, activate the plurality of touch areas for manipulation, and when at least one of the plurality of touch areas for manipulation receives a touching input, deactivate the rest of the plurality of touch areas for manipulation, in which no touching input is received.

The touch controller may be configured to activate a deactivated touch area for manipulation when the at least one of the plurality of touch areas receives no touching input.

The touch controller may be configured to deactivate an activated touch area for manipulation when no touching input is received in the activated touch area for manipulation.

In accordance with various exemplary embodiments of the present invention, a vehicle including: a steering wheel; a touch input disposed on the steering wheel to receive a touching input of a driver; and a touch controller configured to set up a touch area for manipulation on the touch input to control components of the vehicle based on a touch area, in which the touching input is received, wherein the touch controller is further configured to determine a palm touch area of the driver and set up a touch area for manipulation around the palm touch area.

The touch input may be disposed on the rim portion of the steering wheel.

The touch controller may be configured to set an area a predetermined offset away from the palm touch area to the touch area for manipulation.

The touch controller may be configured to set two areas a predetermined offset away from the palm touch area in opposite directions to the touch area for manipulation.

When a touching input is received in the touch area for manipulation, the touch controller may be configured to change the offset based on a point at which the touching input is received in the touch area for manipulation.

The touch controller may be configured to change the offset based on a distance between the point at which the touching input is received and a point in the palm touch area.

The touch controller may be configured to set up a plurality of touch areas for manipulation, activate the plurality of touch areas for manipulation, and when at least one of the plurality of touch areas for manipulation receives a touching input, deactivate the rest of the plurality of touch areas for manipulation, in which no touching input is received.

The touch controller may be configured to activate a deactivated touch area for manipulation when the at least one of the plurality of touch areas receives no touching input.

The touch controller may be configured to deactivate an activated touch area for manipulation when no touching input is received in the activated touch area for manipulation.

In accordance with various exemplary embodiments of the present invention a method for controlling a vehicle, the method including: receiving, by a touch input disposed on a steering wheel of the vehicle, a touching input of a driver; and determining a palm touch area of the driver based on a touch area in which the touch input is received, and setting up a touch area for manipulation around the palm touch area to control components of the vehicle.

Setting up a touch area for manipulation around the palm touch area to control components of the vehicle may comprise setting an area a predetermined offset away from the palm touch area to the touch area for manipulation.

Setting up a touch area for manipulation around the palm touch area to control components of the vehicle may comprise setting two areas a predetermined offset away from the palm touch area in opposite directions to the touch area for manipulation.

In accordance with various exemplary embodiments of the present invention a method for controlling a vehicle, further including: when a touching input is received in the touch area for manipulation, changing the offset based on a point at which the touching input is received in the touch area for manipulation.

Setting up a touch area for manipulation around the palm touch area to control components of the vehicle may comprise setting up a plurality of touch areas for manipulation; activating the plurality of touch areas for manipulation; and when a touching input is received in at least one of the plurality of touch areas for manipulation, deactivating the rest of the plurality of touch areas for manipulation, in which no touching input is received.

Setting up a touch area for manipulation around the palm touch area to control components of the vehicle may comprise activating a deactivated touch area for manipulation when the at least one of the plurality of touch areas receives no touching input.

Setting up a touch area for manipulation around the palm touch area to control components of the vehicle may comprise when no touching input is received in an activated touch area for manipulation, deactivating the activated touch area for manipulation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
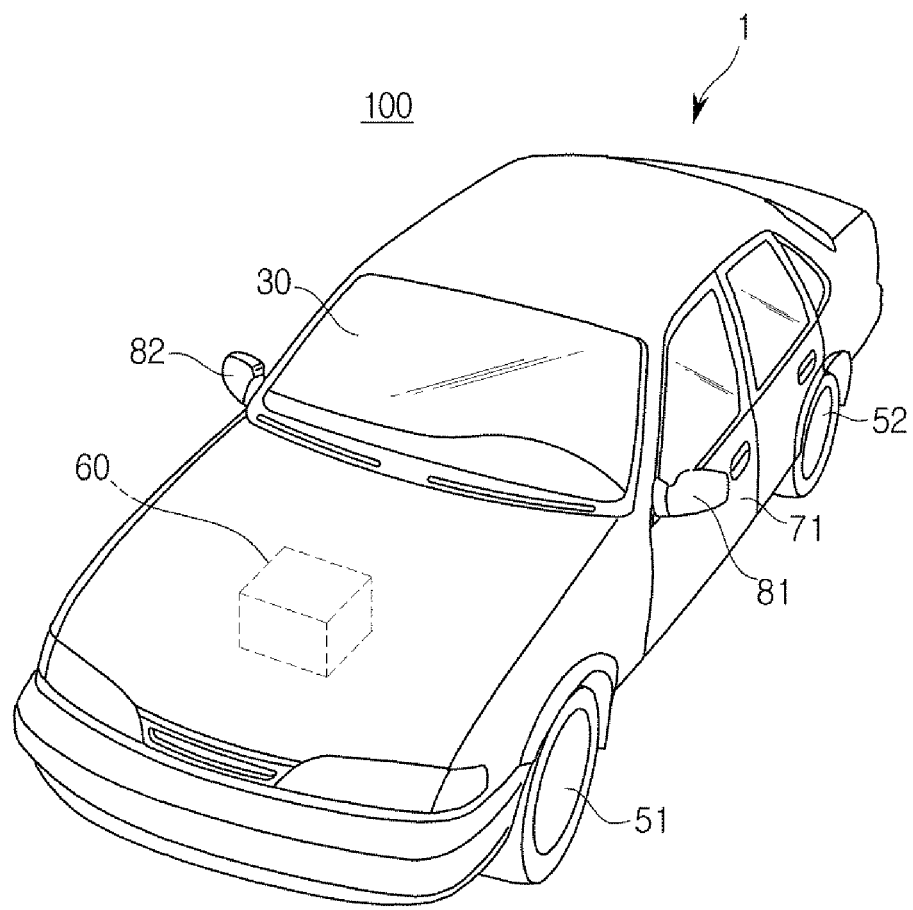
FIG. 1 is an external view of a vehicle looked from outside, according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or portions should not be limited by these terms. These terms are only used to distinguish one element, component, region, layer or portion from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

Embodiments of the present invention will now be described with reference to accompanying drawings.

FIG. 1 is an external view of a vehicle looked from outside, according to an exemplary embodiment of the present invention.

Referring to FIG. 1, a vehicle 100 includes a main body 1 that forms the external of the vehicle 100, wheels 51 and 52 for moving the vehicle 100, a driving system 60 for rotating the wheels 51 and 52, doors 71, 72 for shielding the internal of the vehicle 100 from the outside (see FIG. 2), a front window 30 for providing the user within the vehicle 100 with a view in front of the vehicle 100, and side mirrors 81 and 82 for helping the user see areas behind and to the sides of the vehicle 100.

The wheels 51 and 52 include front wheels 51 and rear wheels 52, and the driving system 60 transmits turning forces to the front wheels 51 or rear wheels 52 to move the vehicle 100 forward or backward thereof. The driving system 60 may employ a motor that produces the turning force from electrical power supplied from a storage battery or a combustion engine that burns a fuel to create the turning force.

The doors 71 and 72 are attached onto the left and right sides of the main body 1, and opened for entering and exiting the vehicle 100 and closed for shielding the internal of the vehicle 100 from the outside.

The front glass 30, also termed as a windshield glass, is placed on the top portion front of the main body 100 for the user within the vehicle 100 to obtain visual information in front of the vehicle 100.

The side mirrors 81 and 82 include a left side mirror 81 and a right side mirror 82 placed on the left and right sides of the main body 1, respectively, for helping the driver obtain views behind and to the side of the vehicle 100.

In addition, the vehicle 100 may include detection devices including a proximity detector for detecting an obstruction or other cars in the back or to the side of the vehicle 100, a rainfall detector for detecting precipitation and whether it is raining, etc.

Figure 2:
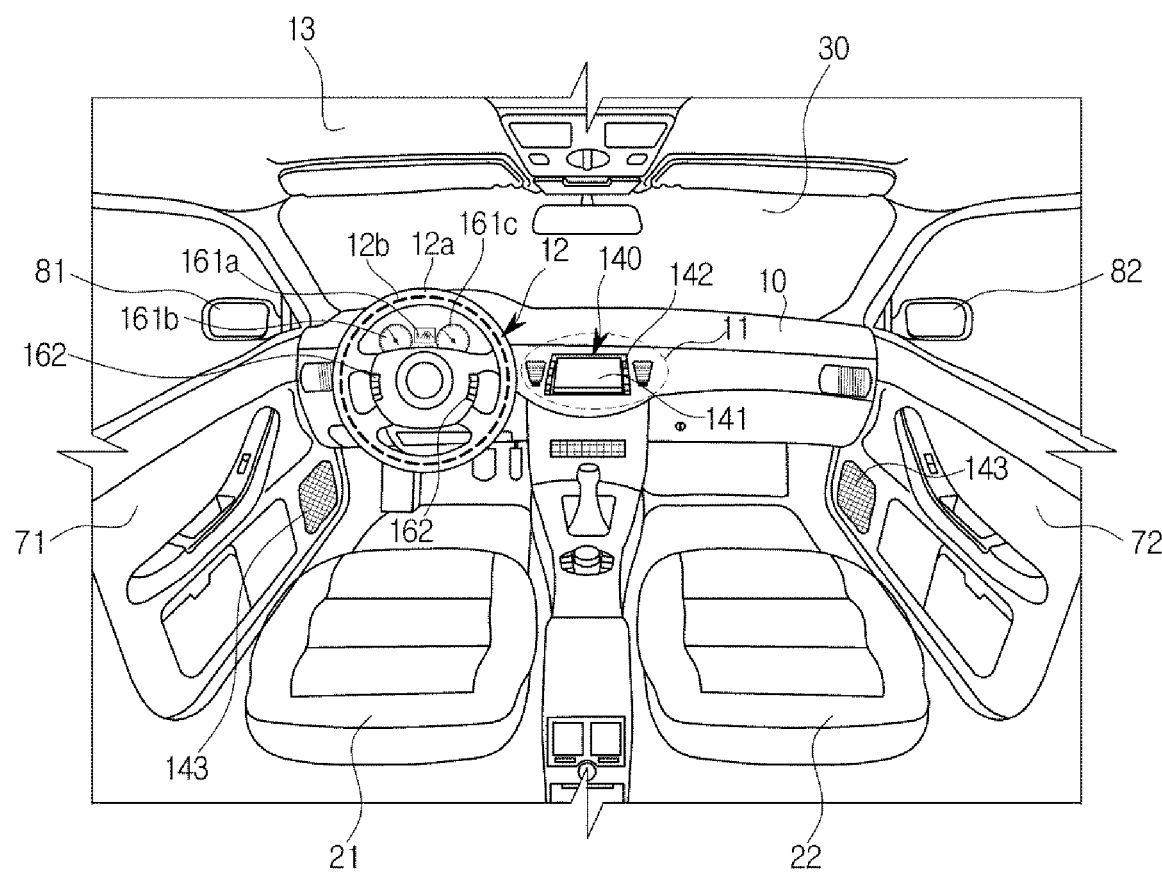
FIG. 2 shows internal features of a vehicle, according to an exemplary embodiment of the present invention.

FIG. 2 shows internal features of a vehicle, according to an exemplary embodiment of the present invention.

Referring to FIG. 2, in a center fascia 11, the center area of a dashboard 10, there may be an Audio Video Navigation (AVN) display 141 and an AVN input 142. An AVN device 140 is an integrated device configured for performing audio, video, and navigation functions, and includes the AVN display 141 implemented by a Liquid Crystal Display (LCD), a Light Emitting Diode (LED), a Plasma Display Panel (PDP), an Organic Light Emitting Diode (OLED), a Cathode Ray Tube (CRT), etc., for selectively displaying at least one of audio, video, and navigation screens.

The AVN input 142 may be manipulated by the user to enter a command to control the AVN device 140.

The AVN input 142 may be implemented in a hard-key type at an area close to the AVN display 141, as shown in FIG. 2.

A speaker 143 may be provided in the vehicle 100 to output sounds which are involved in performing the audio, video, and/or navigation function.

A dashboard 10 may include a steering wheel 12 in front of the driver's seat 21, speed gauge 161*b* and rpm gauge 161*c* indicating current speed and rpm of the vehicle 100, respectively, behind the steering wheel 12, and further include a cluster display 161*a* for displaying information related to the vehicle 100 to a digital screen.

Furthermore, a cluster input 162 is placed on the steering wheel 12 to receive a selection about information to be displayed on the cluster display 161*a* from the user. The cluster input 162 may be easily manipulated by the user behind the wheel, and thus may receive not only the selection of information to be displayed on the cluster display 161*a* but also a command to control the AVN device 140.

In an exemplary embodiment of the present invention, a touch input 12*b* may be provided on the rim 12*a* of the steering wheel 12.

Figure 3:
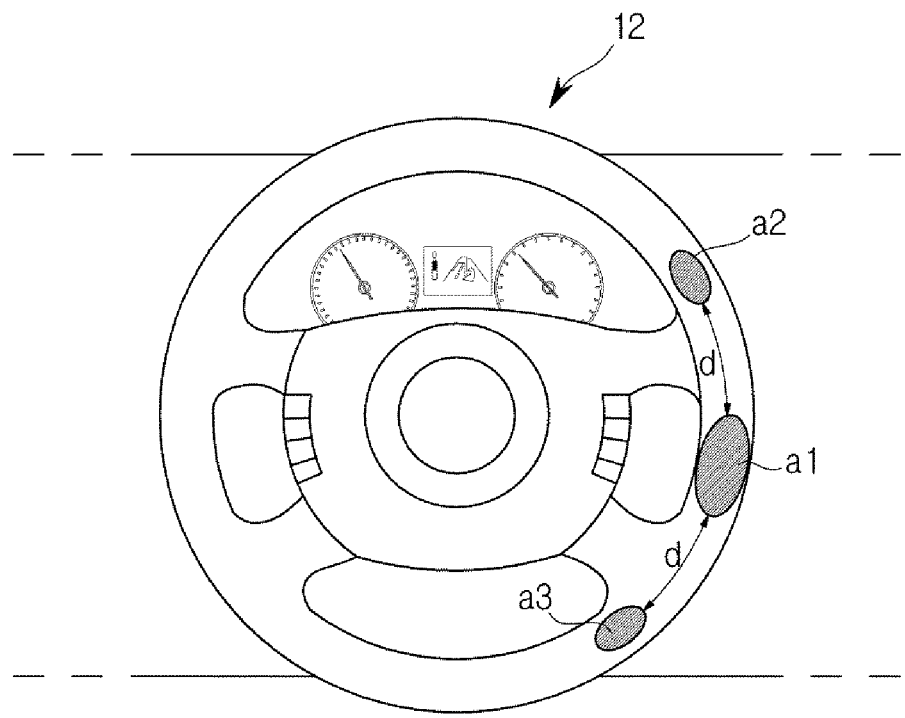
FIG. 3 is an enlarged view of a steering wheel of a vehicle.
Figure 4A:
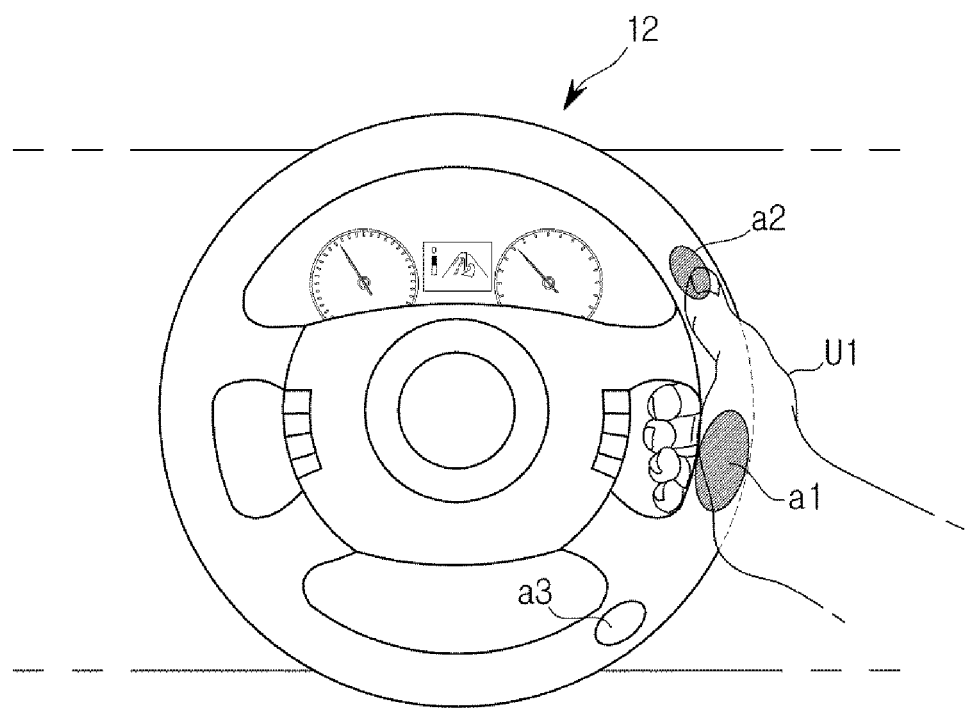
FIG. 4A and FIG. 4B show some gestures of the driver to manipulate a touch input on the steering wheel.
Figure 4B:
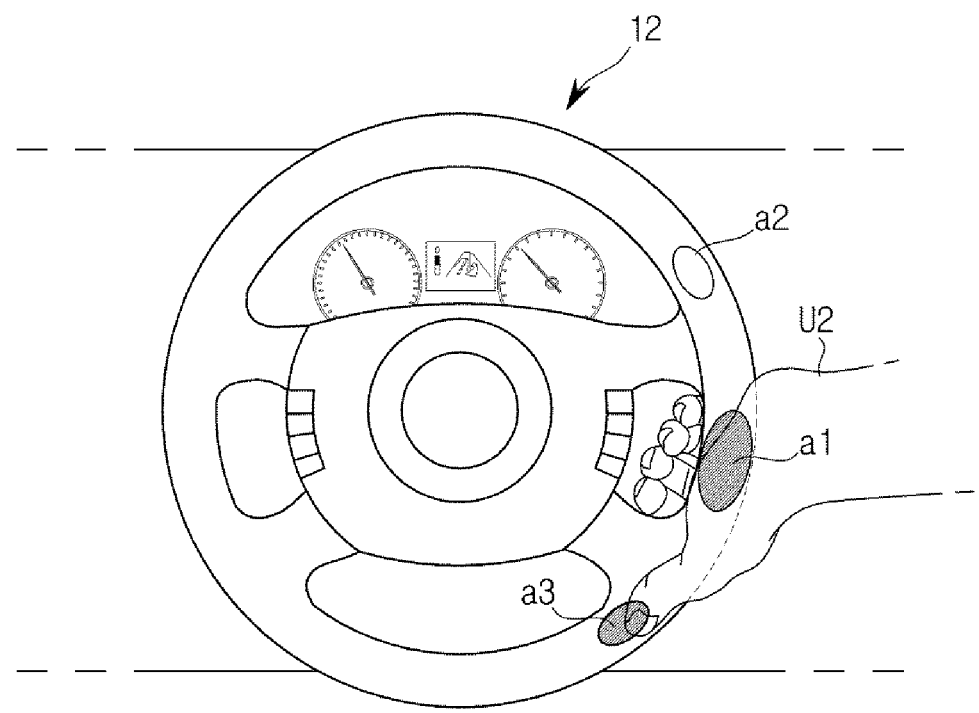

FIG. 3 is an enlarged view of a steering wheel of a vehicle, and FIG. 4A and FIG. 4B show some gestures of the driver to manipulate a touch input on the steering wheel.

The touch input 12*b* may be disposed on the front of the rim 12*a*, and when the rim 12*a* is wrapped with a separate cover, the touch input 12*b* may be attached onto the internal side or the top portion of the cover as a capacitance touch panel.

The touch input 12*b* may be attached onto the front of the rim 12*a* as a single or a successive plurality of capacitance touch panels.

The touch input 12*b* may receive a touching input from the driver wrapping the rim 12*a*.

In an exemplary embodiment of the present invention, the vehicle 100 may further include a touch controller for determining a touching input received through the touch input 12*b* from the driver and activating or deactivating a touch area for manipulation of the touch input 12*b* based on the touching input.

The touch input 12*b* may be easily manipulated by the user behind the wheel, and thus receive a selection command about information to be displayed on the cluster display 161*a* or the AVN display 141, a control command to control the cluster display 161*a* or the AVN device 140, and other various instructions to operate internal components of the vehicle 100. The touch area for manipulation refers to a touch input area, in which to enter various instructions to manipulate internal components of the vehicle 100.

When the touch input 12*b* is implemented as a capacitance touch panel, the touch controller may determine whether a touching input is entered by the driver based on a change in capacitance of the touch panel. The touch controller may also determine whether a touching input from the driver is a palm touching input or a finger touching input based on a touch area of the touch input 12*b*, in which the touching input has been entered by the driver.

When the touch area of the touch input 12*b*, in which the touching input has been entered by the driver, is greater than a predetermined threshold area, the touch controller may determine that the touching input is a palm touching input, and when the touch area is less than the threshold area, the touch controller may determine that the touching input is a finger touching input.

In the instant case, the touch controller may determine the touching input signal using a low pass filter to determine the palm touching input and a high pass filter to determine the finger touching input.

When the touching input of the driver is determined to be the palm touching input, the touch controller may set the touch area to a blob area a1, set up touch areas for manipulation a2, a3 based on the blob area a1, and activate the touch areas a2, a3 for manipulation.

For example, the touch areas a2, a3 for manipulation may be two partial areas a2, a3 of the touch input 12*b* a predetermined offset d away from the blob area a1. The predetermined offset d may be a predetermined value in a manufacturing stage, a value manually entered by the driver beforehand, or a value set by learning of the touch controller.

As the touch controller activates the touch areas a2, a3 for manipulation, the driver may be able to enter various commands into the touch areas a2, a3 for manipulation to operate internal components of the vehicle 100.

Meanwhile, as shown in FIG. 4A, when the driver enters a command using his or her right hand U1, a finger of the right hand U1 steering the vehicle 100 is placed on the touch area a2 for manipulation in an upper area counterclockwise from the blob area a1. Accordingly, when a touching input is received in the touch area a2 for manipulation in the upper area counterclockwise from the blob area a1, the touch controller may deactivate the touch area a3 for manipulation in a lower area clockwise from the blob area a1.

By deactivating the touch area a3 for manipulation in the lower area clockwise from the blob area a2, unnecessary power consumption may be reduced.

On the other hand, as shown in FIG. 4B, when the driver enters a command using his or her left hand U2, a finger of the left hand U2 steering the vehicle 100 is placed on the touch area a3 for manipulation in the lower area clockwise from the blob area a1. Accordingly, when a touching input is received in the touch area a3 for manipulation in the lower area clockwise from the blob area a1, the touch controller may deactivate the touch area a2 for manipulation in the upper area counterclockwise from the blob area a1.

Figure 5A:
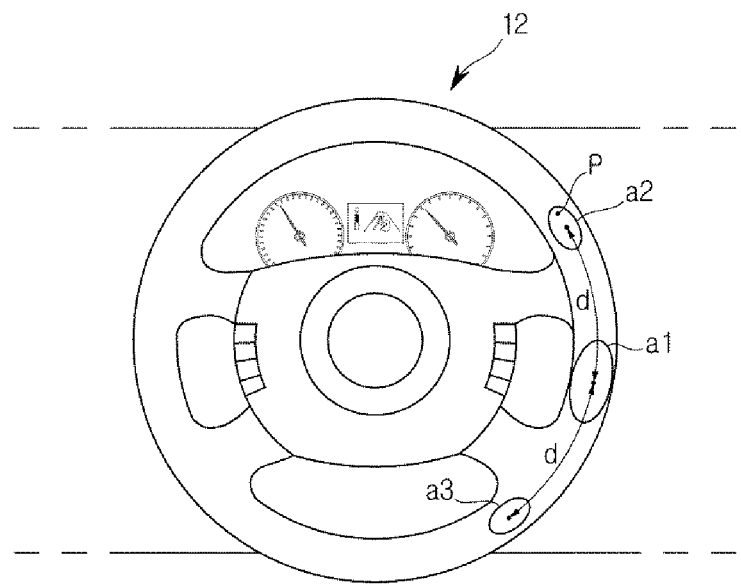
FIG. 5A and FIG. 5B are conceptual diagrams for explaining a new offset set by learning.
Figure 5A:
Figure 5A:
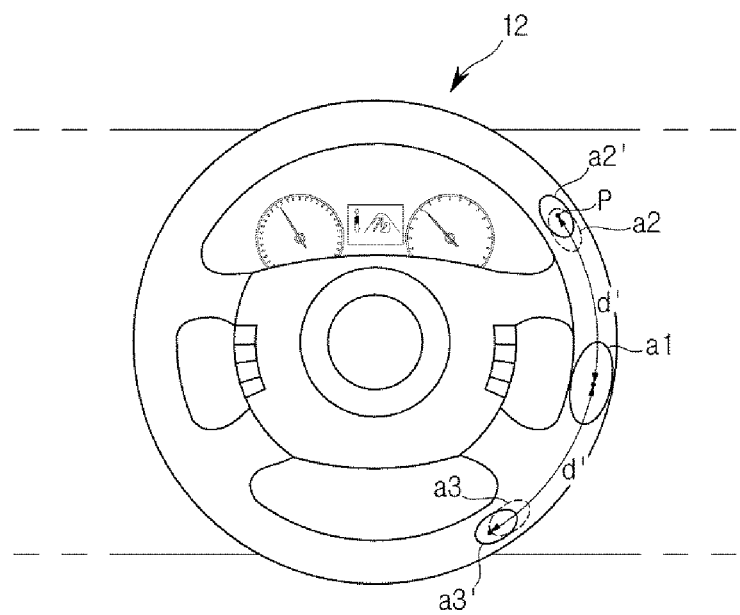
Figure 5B:
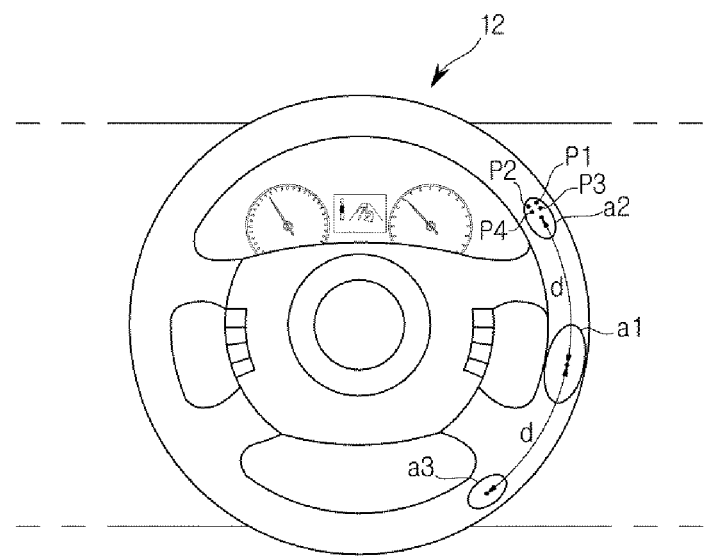
Figure 5B:
Figure 5B:
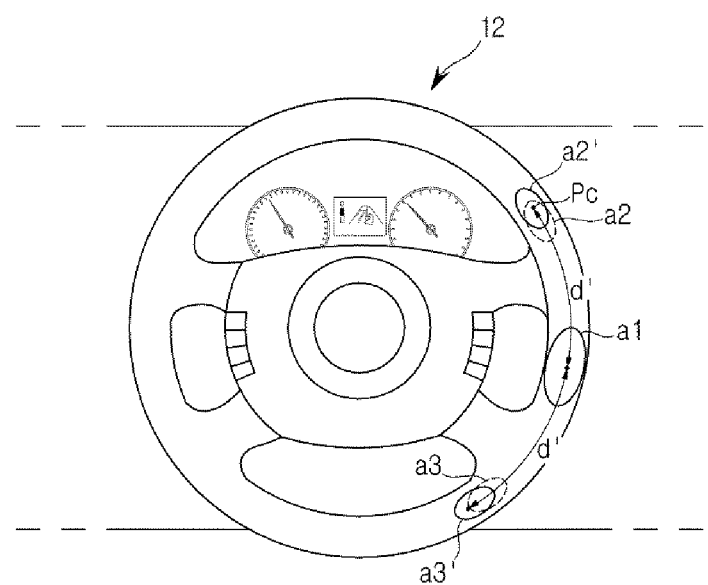

The touch controller may set a new offset by learning about points within the touch areas a2, a3 for manipulation, at which touching inputs have been received. FIG. 5A and FIG. 5B are conceptual diagrams for explaining a new offset set by learning.

Referring to FIG. 5A, when a touching input is received in the single touch area a2 for manipulation, the touch controller may change a setting value of the offset d based on a point at which the touching input has been received. In the instant case, the touch controller may set a distance from a point in the blob area a1 to a point p, at which the touching input has been received, to the new offset d'.

For example, when a touching input is received at a point p in the touch area a2 for manipulation above the blob area a1, the touch controller may set a distance from a center point of the blob area a1 to the point p, at which the touching input has been received, to the new offset d'.

The offset d may be expanded or reduced depending on the point, at which the touching input has been received, and accordingly, the touch areas a2, a3 for manipulation may also be changed (into a2', a3', respectively).

Furthermore, referring to FIG. 5B, when a touching input is received multiple times in the single touch area a2 for manipulation, the touch controller may change a setting value of the offset d based on a plurality of points p1~p4, at which the touching input has been received. In the instant case, the touch controller may set a distance from a point in the blob area a1 to a center point $p_c$ of the plurality of points p1~p4 at which the touching input has been received to the new offset d'.

For example, when the touching input is received at the plurality of points p1~p4 in the touch area a2 for manipulation in the upper area from the blob area a1, the touch controller may set a distance from the center point of the blob area a1 to the center point $p_c$ of the plurality of points p1~p4, at which the touching input has been received, to the new offset d'.

Such a newly set offset d' may be stored in a memory to be used by the controller in a subsequent process of setting up a touch area for manipulation. The touch areas a2, a3 for manipulation may be changed into a2', a3', respectively.

Although an occasion when the driver makes a touching input on the right side of the steering wheel 12 was referred to as an exemplary embodiment in the above embodiment, the driver may make a touching input with his or her left hand on the left side of the steering wheel 12, in which case, the touching input is received in a touch area for manipulation in an upper area clockwise from the blob area, and the touch controller may deactivate a touch area for manipulation in a lower area counterclockwise from the blob area. On the other hand, when the driver may make a touching input with his or her right hand on the left side of the steering wheel 12, the touching input is received in a touch area for manipulation in a lower area counterclockwise from the blob area, and the touch controller may deactivate a touch area for manipulation in the upper area clockwise from the blob area.

Besides, the driver may make touching inputs at any points, so the present invention is not limited to the aforementioned embodiment.

In the meantime, when no touching input has been received in an activated touch area for manipulation for over a predetermined first reference time period (e.g., 5 seconds), the touch controller may activate even the remaining touch area(s) for manipulation that has (have) been deactivated.

However, when any touching input has not been received, i.e., there has been no palm grip in the blob area for over a predetermined second reference time period (e.g., 10 seconds), all the touch areas for manipulation are deactivated. It may be determined whether there is a new touching input received through the touch input 12b again from the driver, and a blob area may be set up again based on a touch area of the input device 12b, in which the touching input has been received.

The touch controller may be implemented with a memory for storing an algorithm to control operation of the touch input 12b or control components in the vehicle 100 based on a touching input received through the touch input 12b or data of a program representing the algorithm, and a processor or for performing the aforementioned operation using the data stored in the memory. The memory and the processor may be implemented in separate chips. Alternatively, the memory and the processor may be implemented in a single chip.

At least one component may be added or deleted to correspond to the performance of the components of the vehicle 100. Furthermore, it will be obvious to the ordinary skilled people in the art that the relative positions of the components may be changed to correspond to the system performance or structure.

Some components of the vehicle 100 may be implemented in software, or hardware including Field Programmable Gate Arrays (FPGSs) and Application Specific Integrated Circuits (ASICs).

Figure 6:
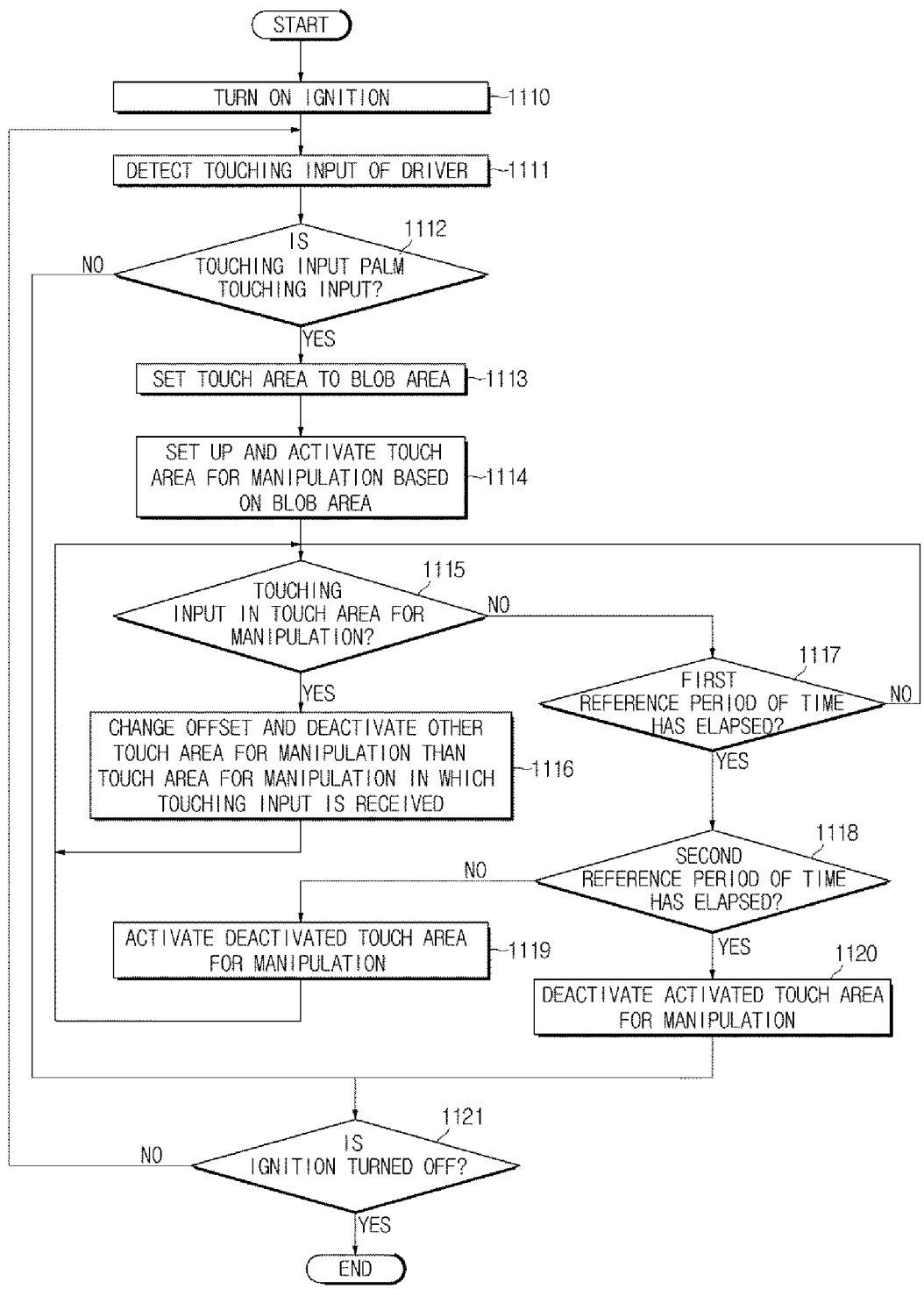
FIG. 6 is a flowchart illustrating a method for controlling a vehicle including a steering wheel, according to an exemplary embodiment of the present invention.

A method for controlling the vehicle 100 including the steering wheel In accordance with various exemplary embodiments of the present invention will now be described with reference to FIG. 6. FIG. 6 is a flowchart illustrating a method for controlling a vehicle including a steering wheel, according to an exemplary embodiment of the present invention.

Since components of the vehicle 100 as will be mentioned below are the same as those of the vehicle 100 including the steering wheel 12 as described with reference to FIG. 1, FIG. 2, FIG. 3, FIG. 4, FIG. 5A and FIG. 5B, the same reference numerals will be used in the following description.

First, referring to FIG. 6, after the vehicle 100 is started in 1110, the touch input 12b detects a touching input of the driver in 1111, and the touch controller determines whether the touching input is a palm touching input in 1112.

The detecting of the touching input of the driver may include determining, by the touch controller, the touching input based on a change in capacitance of a capacitance touch panel when the touch input 12b is implemented by the capacitance touch panel. For example, when the change in capacitance is greater than a predetermined threshold, the touch controller may determine that there has been a touching input.

The determination of whether the touching input is a palm touching input may be made by the touch controller based on the size of a touch area of the touch input 12b in which the touching input has been received. For example, when the touch area, in which the touching input has been entered by the driver, is larger than a predetermined threshold area, the touch controller may determine that the touching input is a palm touching input, and when the touch area is less than the threshold area, the touch controller may determine that the touching input is a finger touching input.

The determination of whether the touching input is a palm touching input of the driver may include having the touching input signal received through the touch input 12b pass the low pass filter to detect a palm touching input signal, or pass the high pass filter to detect a finger touching input signal.

When the touching input is determined to be a palm touching input in 1112, the touch controller sets the detected touch area to a blob area in 1113. However, when the touching input is not determined to be a palm touching input in 1112, the touch controller performs a procedure of receiving a touching input of the driver in 1111 and determining whether a touching input is a palm touching input until the ignition of the vehicle is turned off in 1121.

Setting the detected touch area to a blob area may include, for example, setting an area formed by edge portions of the touch area to the blob area, or extracting center coordinates of the touch area and setting an area formed by a predetermined figure centered on the center coordinates to the blob area, without being limited thereto.

The touch controller then sets up a touch area for manipulation based on the set blob area and activates the touch area for manipulation, in 1114.

The touch area for manipulation may be one or more areas located as far as a predetermined offset from the blob area.

For example, the touch controller may set two areas an offset away from the blob area in opposite directions to the touch area for manipulation.

The predetermined offset may be a predetermined value in a manufacturing stage, a value manually entered by the driver beforehand, or a value set by learning of the touch controller.

When the touch controller activates the touch area for manipulation, the driver may be able to enter various commands to control internal components of the vehicle 100. For example, the driver may select a content displayed on the AVN display 141 or the cluster display 161a by making a touching input on the touch area for manipulation.

The touch controller then determines whether a touching input is made by the driver in the touch area for manipulation, in 1115.

The determination of whether a touching input is made by the driver may include determining a touch area for manipulation in which a touching input is made, when a plurality of touch areas for manipulation are set up.

When a touching input is received from the driver in 1115, the touch controller changes an offset (i.e., learns an offset) based on a point at which the touching input has been received, and deactivates other touch area(s) for manipulation, in which no touching input has been made, than the touch area for manipulation, in which the touching input has been made, in 1116. How to change an offset was described above with reference to FIG. 5A and FIG. 5B, so the overlapping description will be omitted below.

The touch controller may keep the activated touch area for manipulation as it is when there are continuous touching inputs in the activated touch area for manipulation, or may activate a deactivated touch area in 1119 when there has been no touching input in the activated touch area for manipulation for the first reference time period (i.e., the first reference time period has elapsed without any touching input in 1117), allowing all the plurality of touch areas for manipulation to be able to receive touching inputs.

The activation of the deactivated touch area in 1119 may be performed until the second reference time period, which is greater than the first reference time period, has not elapsed.

When the second reference time period has elapsed in 1117, 1118 without detection of any touching input in the activated touch area for manipulation in 1115, the touch controller determines that there would be no touching input to the touch input 12b and deactivates the activated touch area for manipulation, 1120.

Even while the touch area for manipulation is deactivated, the touch input 12b may still detect whether there is a touching input of the driver until the ignition is turned off in 1121, and may change the blob area by detecting another palm touching input in 1112, as described above.

The exemplary embodiments of the present invention may be implemented in a form of recording media for storing instructions to be conducted by a computer. The instructions may be stored in a form of program codes, and when executed by a processor, may generate program modules to perform operation in the exemplary embodiments of the present invention. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The exemplary embodiments of the present invention have thus far been described with reference to accompanying drawings. It will be obvious to people of ordinary skill in the art that the present invention may be practiced in other forms than the exemplary embodiments as described above without changing the technical idea or essential features of the present invention. The above embodiments are only by way of example, and should not be interpreted in a limited sense.

According to embodiments of the present invention, a touch input device on a steering wheel provided in the vehicle may have increased usability and convenience and may lead to various user interfaces.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering wheel comprising:
 a touch input device configured to receive a touching input of a driver, and
 a processor configured to set up a touch area for manipulation on the touch input device to control components of a vehicle based on a touch area, in which the touching input is received,
 wherein the processor is further configured to determine a palm touch area of the driver and set up a touch area for manipulation around the palm touch area,
 wherein the processor is configured to set up the touch area for manipulation when the touch area in which the touching input is received is larger than a predetermined threshold area,
 wherein the processor is configured to activate the touch area for manipulation around the palm touch area by touching exceeding the predetermined threshold area of the steering wheel,
 wherein the processor is configured to set up the touch area for manipulation based on a position of a palm touching input,
 wherein the processor is configured to set an area in a predetermined offset away from the palm touch area to the touch area for manipulation,
 wherein the touch area for manipulation includes a first touch area for manipulation and a second touch area for manipulation, and
 wherein the processor is configured to set two areas in a predetermined offset away in clockwise and counterclockwise directions along a circumferential direction of the steering wheel, from the palm touch area to the first and second touch areas for manipulation, respectively.

2. The steering wheel of claim 1, wherein the touch input device is disposed on a rim portion of the steering wheel.

3. The steering wheel of claim 1, wherein, when the touching input is received in the touch area for manipulation, the processor is configured to change the predetermined offset based on a point at which the touching input is received in the touch area for manipulation.

4. The steering wheel of claim 3, wherein the processor is configured to change the predetermined offset based on a distance between the point at which the touching input is received and a point in the palm touch area.

5. The steering wheel of claim 1, wherein the processor is configured to set up a plurality of touch areas for manipulation, to activate the plurality of touch areas for manipulation, and when at least one of the plurality of touch areas for manipulation receives the touching input, to deactivate a rest of the plurality of touch areas for manipulation, in which no touching input is received.

6. The steering wheel of claim 5, wherein the processor is configured to activate a deactivated touch area for manipulation when the at least one of the plurality of touch areas receives no touching input.

7. The steering wheel of claim 5, wherein the processor is configured to deactivate an activated touch area for manipulation when no touching input is received in the activated touch area for manipulation.

8. A vehicle comprising:
 a steering wheel;
 a touch input device disposed on the steering wheel to receive a touching input of a driver; and
 a processor configured to set up a touch area for manipulation on the touch input device to control components of the vehicle based on a touch area, in which the touching input is received,
 wherein the processor is further configured to determine a palm touch area of the driver and set up a touch area for manipulation around the palm touch area,
 wherein the processor is configured to set up the touch area for manipulation when the touch area in which the touching input is received is larger than a predetermined threshold area,
 wherein the processor is configured to activate the touch area for manipulation around the palm touch area by touching exceeding the predetermined threshold area of the steering wheel,
 wherein the processor is configured to set up the touch area for manipulation based on a position of a palm touching input,
 wherein the processor is configured to set an area in a predetermined offset away from the palm touch area to the touch area for manipulation,
 wherein the touch area for manipulation includes a first touch area for manipulation and a second touch area for manipulation, and
 wherein the processor is configured to set two areas in a predetermined offset away in clockwise and counterclockwise directions along a circumferential direction of the steering wheel, from the palm touch area to the first and second touch areas for manipulation, respectively.

9. The vehicle of claim 8, wherein the touch input device is disposed on a rim portion of the steering wheel.

10. The vehicle of claim 8, wherein, when a touching input is received in the touch area for manipulation, the processor is configured to change the predetermined offset based on a point at which the touching input is received in the touch area for manipulation.

11. The vehicle of claim 10, wherein the processor is configured to change the predetermined offset based on a distance between the point at which the touching input is received and a point in the palm touch area.

12. The vehicle of claim 8, wherein the processor is configured to set up a plurality of touch areas for manipulation, activate the plurality of touch areas for manipulation, and when at least one of the plurality of touch areas for manipulation receives the touching input, deactivate a rest of the plurality of touch areas for manipulation, in which no touching input is received.

13. The vehicle of claim 12, wherein the processor is configured to activate a deactivated touch area for manipulation when the at least one of the plurality of touch areas receives no touching input.

14. The vehicle of claim 12, wherein the processor is configured to deactivate an activated touch area for manipulation when no touching input is received in the activated touch area for manipulation.

15. A method for controlling a vehicle, the method comprising:
 receiving, by a touch input device disposed on a steering wheel of the vehicle, a touching input of a driver;
 determining a palm touch area of the driver based on a touch area in which the touch input is received, and
 setting up a touch area for manipulation around the palm touch area to control components of the vehicle; and activating the touch area for manipulation around the palm touch area by touching exceeding a predetermined threshold area of the steering wheel, wherein the setting up the touch area for manipulation around the palm touch area to control the components of the vehicle includes setting up the touch area for manipulation the touch area in which the touching input is received, is larger than the predetermined threshold area, wherein the setting up the touch area for manipulation around the palm touch area to control the components of the vehicle includes setting an area in a predetermined offset away from the palm touch area to the touch area for manipulation, wherein the touch area for manipulation includes a first touch area for manipulation and a second touch area for manipulation, and wherein the setting up the touch area for manipulation around the palm touch area to control the components of the vehicle includes setting two areas in a predetermined offset away in clockwise and counterclockwise directions along a circumferential direction of the steering wheel, from the palm touch area to the first and second touch areas for manipulation, respectively.

16. The method of claim 15, further including: when the touching input is received in the touch area for manipulation, changing the offset based on a point at which the touching input is received in the touch area for manipulation.

17. The method of claim 15, wherein the setting up the touch area for manipulation around the palm touch area to control the components of the vehicle includes:

setting up a plurality of touch areas for manipulation;

activating the plurality of touch areas for manipulation; and when the touching input is received in at least one of the plurality of touch areas for manipulation, deactivating a rest of the plurality of touch areas for manipulation, in which no touching input is received.

18. The method of claim 17, wherein the setting up the touch area for manipulation around the palm touch area to control the components of the vehicle includes activating a deactivated touch area for manipulation when the at least one of the plurality of touch areas receives no touching input.

19. The method of claim 17, wherein the setting up the touch area for manipulation around the palm touch area to control the components of the vehicle includes:

when no touching input is received in an activated touch area for manipulation, deactivating the activated touch area for manipulation.

* * * * *